United States Patent [19]

Broniewski

[11] 4,246,078

[45] Jan. 20, 1981

[54] METHOD OF CONCENTRATING ALKALI METAL HYDROXIDE IN HYBRID CELLS HAVING CATION SELECTIVE MEMBRANES

[75] Inventor: Bogdan M. Broniewski, Newport Beach, Calif.

[73] Assignee: Occidental Research Corporation, Irvine, Calif.

[21] Appl. No.: 86,941

[22] Filed: Oct. 22, 1979

Related U.S. Application Data

[63] Continuation of Ser. No. 32,466, Apr. 23, 1979, abandoned.

[51] Int. Cl.³ .......................... C25B 1/16; C25B 1/02; C25B 5/00
[52] U.S. Cl. ...................................... 204/98; 204/129; 204/DIG. 4
[58] Field of Search .................. 204/98, 129, DIG. 4, 204/266

[56] References Cited

U.S. PATENT DOCUMENTS

| 2,384,463 | 9/1945 | Gunn et al. | 204/DIG. 4 |
| 3,262,868 | 7/1966 | Juda | 204/98 |
| 3,600,228 | 8/1971 | La Conti | 204/DIG. 4 |
| 4,093,531 | 6/1978 | Babinsky et al. | 204/DIG. 4 |
| 4,173,524 | 11/1979 | McRae | 204/266 |

FOREIGN PATENT DOCUMENTS 642449  4/1959  Canada ............................ 204/DIG. 4

*Primary Examiner*—R. L. Andrews
*Attorney, Agent, or Firm*—Christie, Parker & Hale

[57] ABSTRACT

A flow of an alkali hydroxide solution such as chloralkali cell liquor containing NaOH and NaCl is introduced into the anode compartment of a hybrid cell which also includes a cathode compartment separated from the anode compartment by a cation selective, permeable membrane. The anode and the cathode permit gas diffusion. Gaseous hydrogen is supplied to the anode; air to the cathode; and a flow of water or other aqueous solution to the cathode compartment. The chloralkali cell is electrically connected to the hybrid cell. When the same number of coulombs flow through the chloralkali cell and the hybrid cell, the introduced chloralkali cell liquor is depleted of alkali metal ions which pass through the membrane to the water flowing through the cathode compartment. Through electrolytic consumption of water and evaporation of water from the cathode surface, highly purified caustic solutions of up to 50% caustic content can be obtained.

24 Claims, 3 Drawing Figures

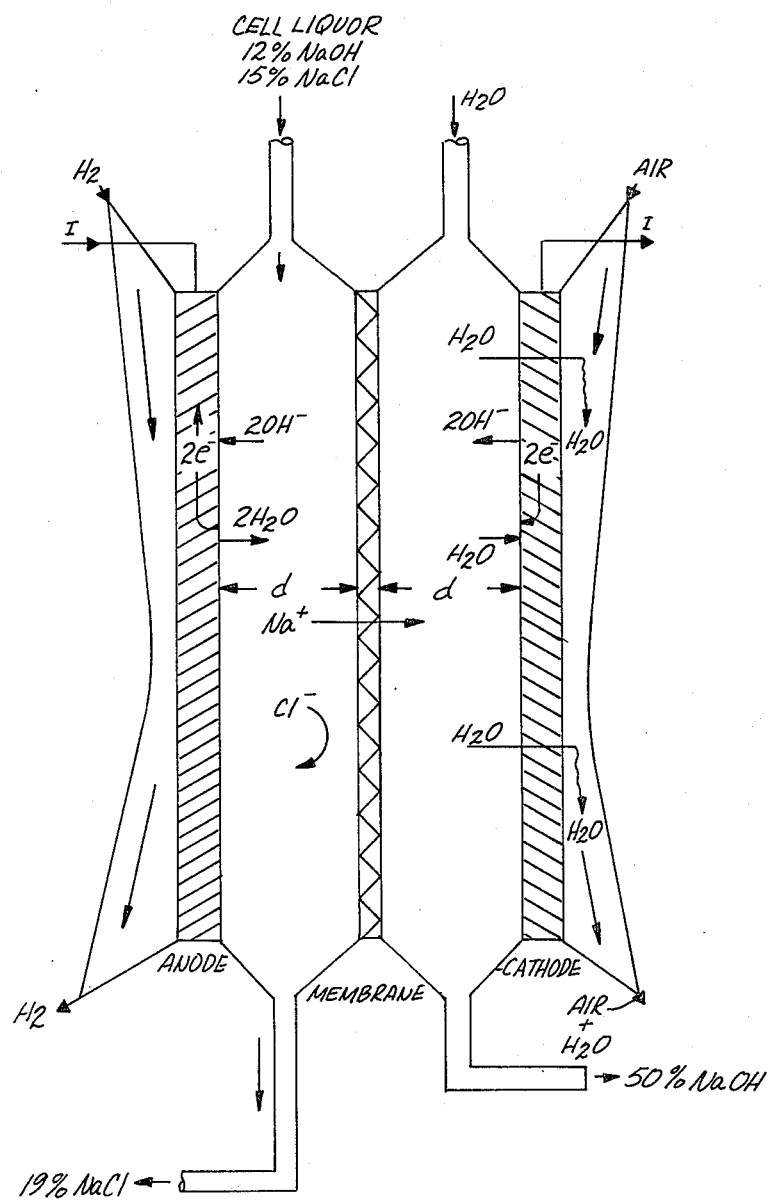

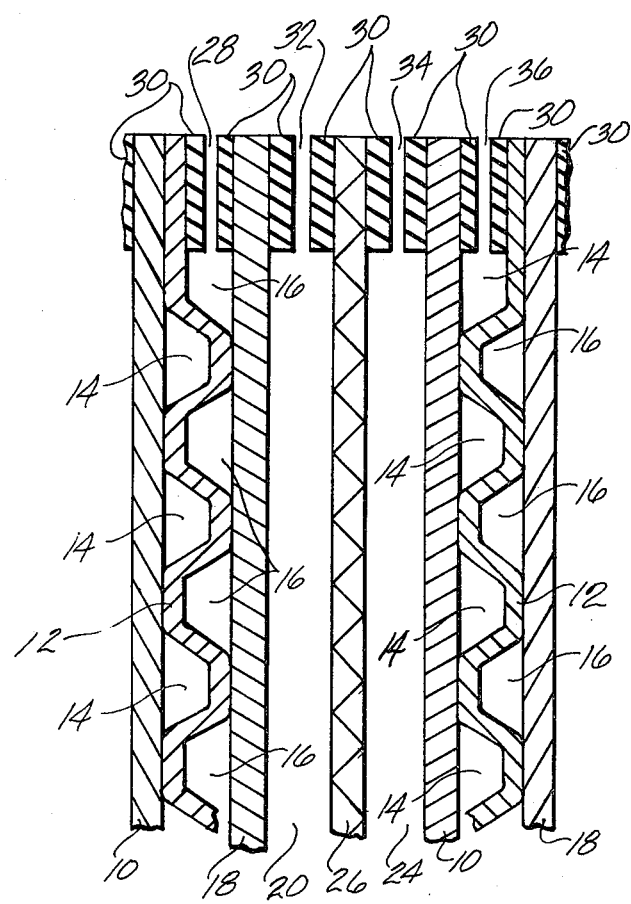

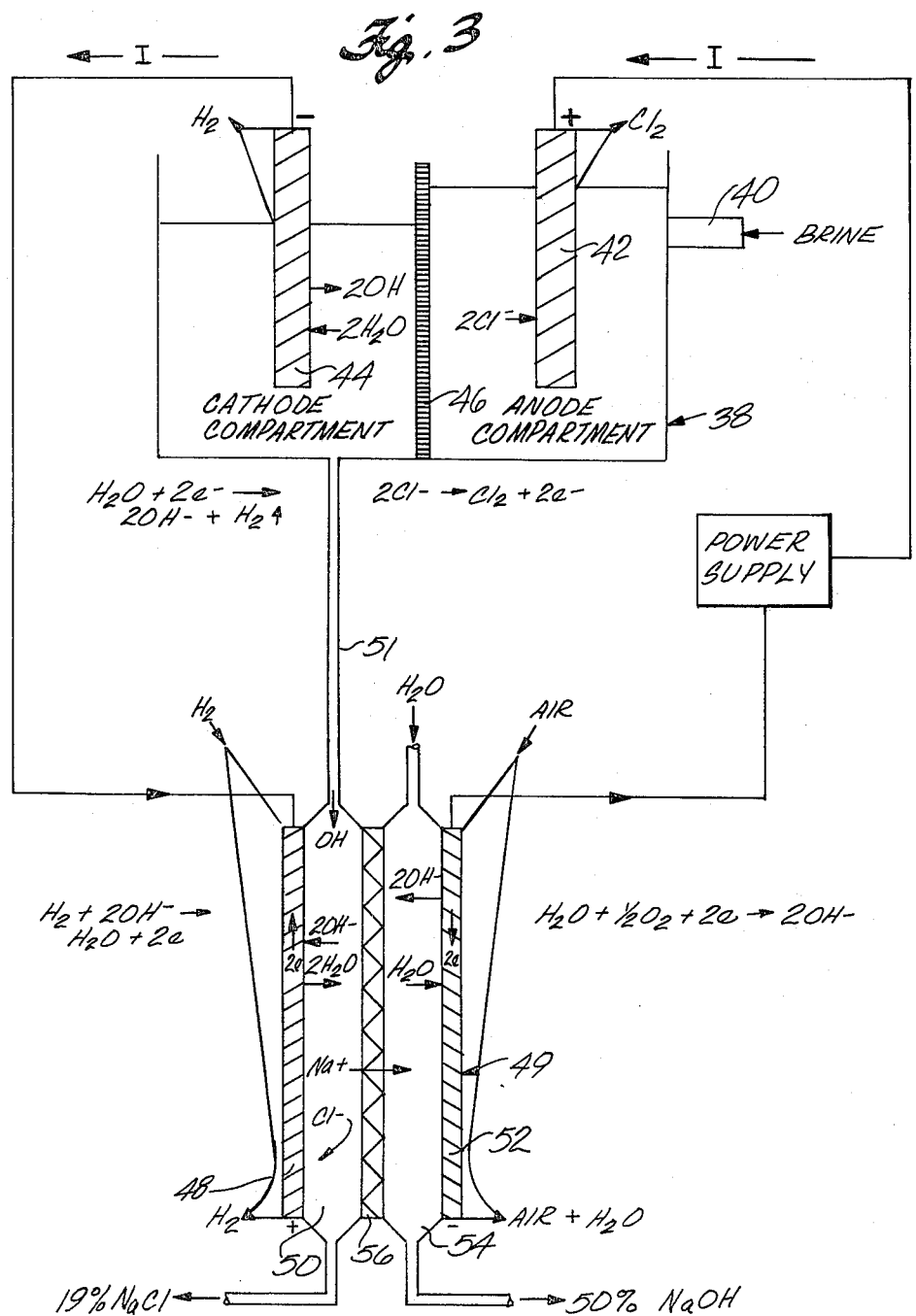

METHOD OF CONCENTRATING ALKALI METAL HYDROXIDE IN HYBRID CELLS HAVING CATION SELECTIVE MEMBRANES

This is a continuation of application Ser. No. 32,466, filed Apr. 23, 1979, now abandoned.

BACKGROUND OF THE INVENTION

The present invention relates to electrochemical processes for production of chlorine and caustic from brine and to the simultaneous production of electrical energy. More particularly, the invention is directed to the treatment of cell liquor from chloralkali cell to separate the sodium ions from the cell liquor and concentrate them in another liquor to form a sodium hydroxide solution.

The production of chlorine and crude caustic solutions by electrolysis of brine is a major industry. Two types of electrolysis cells are used in the production of chlorine and caustic; the diaphragm cell and the membrane cell. Considerable quantities of energy are required for electrolysis of the brine to produce chlorine and subsequent treatment of the cell liquor resulting from electrolysis to obtain caustic solutions of the desired purity and concentration. A 50 weight percent aqueous caustic solution of low sodium chloride content is a commercially desired product.

Known processes for electrolysis of brine produce cathode cell liquors having a caustic content of about 10 to 15 percent by weight, occasionally as high as about 25 percent by weight, and a sodium chloride content of up to about 15 percent by weight. The cell liquor produced by a diaphragm cell typically contains about 10 to 12 percent by weight caustic (NaOH) and 15 percent by weight sodium chloride (NaCl).

In the diaphragm cell, brine is continuously fed to an anode compartment, where chlorine is produced, and then flows through a diaphragm, usually made of asbestos, to a cathode compartment. Hydrogen gas is discharged from the solution at the cathode, with attendant generation of hydroxyl ions. To minimize back-migration of hydroxide ions from the cathode compartment to the anode compartment, a positive flow rate is always maintained; that is, a flow in excess of the conversion rate. As a consequence, the resulting catholyte solution, i.e., the cathode cell liquor as the term is used herein, has unconsumed sodium chloride in addition to product sodium hydroxide. The cathode cell liquor containing the sodium hydroxide and sodium chloride must be purified and concentrated to obtain a caustic solution of commercial value and yield a sodium chloride solution that can be recycled to the diaphragm cell.

A membrane cell, which employs a membrane selectively permeable to certain cations in place of a diaphragm, yields a catholyte of low salt content and having a caustic content of up to about 25 percent by weight or more. The highly corrosive caustic medium, however, is harsh on membrane materials and specifications for the membrane must be rigid. Membranes are quite complex and expensive. In addition, voltage drop within the membrane cell is relatively high which increases consumption of electricity. In sum, membrane cells are costly in regard to investment and operating costs.

Typical processes for concentrating cell liquor and separating the sodium chloride from the caustic involve evaporation and crystallization with the consumption of large amounts of steam and consequently, fuel required to generate steam. Investment in such processes is considerable.

One solution to the problem of obtaining cell liquor having high caustic concentration is described in U.S. Pat. No. 3,899,403 to Cook, Jr., et al. A three-compartment electrolytic cell produces solutions of high and low caustic concentration. A two-compartment cell then concentrates the solution of low caustic concentration. Current efficiency in the two-compartment cell is lower than that in the three-compartment cell. Overall current efficiency is about 70 percent. As both cells consume electric power, the energy cost of the process is high.

U.S. Pat. No. 4,036,717 to Babinsky et al describes a three-chamber electrolytic cell for concentrating and purifying cell liquor containing sodium or potassium hydroxide.

The Babinsky cell has a porous catalytic anode, a porous asbestos diaphragm between the anode chamber and a central chamber, and a cation-permselective membrane between the central chamber and the cathode chamber. Cell liquor is passed through the central chamber and concentrated caustic is withdrawn from the cathode chamber. Hydrogen gas generated by the electrolysis is supplied to the anode to decrease the potential across the cell below the evolution potential for chlorine and coincidentally reduce the power requirements for the cell.

The use of hydrogen-air fuel cells to consume hydrogen gas from chloralkali cells and to produce electricity for powering a portion of the chloralkali cells is described in Canadian Pat. No. 642,449. In the process described, hydrogen formed by the electrolysis of brine in a chloralkali cell is fed to the anode of a fuel cell and air is fed to the cathode. The fuel cell employs an aqueous electrolyte of sodium or potassium hydroxide having a concentration of 5 to 50 weight percent. There is no suggestion in the patent that the cell liquor from the chloralkali cells can be purified or concentrated by using such cell liquor as the electrolyte in the fuel cell.

U.S. Pat. No. 3,511,712 to Giner describes a process for removing carbon dioxide from gas streams using a fuel cell. An alkali metal carbonate solution formed by absorption of carbon dioxide is introduced to the anode compartment of a fuel cell operating by consumption of an oxidant and a fuel to generate hydrogen ions, consume hydroxyl ions and generate electricity. Operation decreases the pH of the electrolyte in the vicinity of the anode to a point where carbon dioxide is evolved with a simultaneous increase of pH. This restores the carbon dioxide absorptive capacity of the solution. The patent does not suggest the use of a fuel cell to purify and concentrate chloralkali cell liquor and, in fact, the Giner process would not be suitable for the treatment of cell liquor because the required lowering of the anolyte pH to 9 results in polarization of the anode and a severe lowering of the current efficiency of the cell.

SUMMARY OF THE INVENTION

In accordance with the present invention, there is provided a process for the simultaneous production of alkali metal hydroxide and the generation of electrical energy using a hybrid cell. The invention is particularly directed to forming a purified and concentrated caustic solution from the effluent of a chloralkali cell with attendant generation of electrical energy for use by the chloralkali cell.

In the process of the invention, an aqueous solution of at least one alkali metal hydroxide is caused to flow, as anolyte, through the anode compartment of at least one hybrid cell which is comprised of a gas diffusion type anode spaced from one surface of a cation permeable membrane to form the anode compartment and a cathode compartment formed by a gas diffusion type cathode spaced from the opposite surface of the membrane. A flow of catholyte, which is an aqueous media receptive to alkali metal ions, is introduced to the cathode compartment. A flow of current from the cathode through an external load to the anode is produced by electrochemical reduction of oxygen at the cathode and electrochemical oxidation of hydrogen at the anode. Under conditions of current flow, some alkali metal ions move transversely to the flow of the anolyte, through the membrane, and into the catholyte. This results in separation of some of the alkali metal ions from the anolyte passing through the path defined by the anode compartment. The separated alkali ions are taken up by the catholyte passing through the path defined by the cathode compartment.

In the preferred embodiment of the invention, the anode and cathode compartments are such that flow of the anolyte and catholyte are substantially in one direction from inlet to outlet without appreciable mixing, back convection, or diffusion of molecules and ions in each compartment, and wherein cation flow is substantially transverse to the flow of the anolyte.

Concentration of the alkali metal hydroxide in the receptive aqueous media occurs as a consequence of cation transfer, electrolytic consumption of water at the cathode to form hydroxyl ions, and evaporation of water through the cathode into air. Air, the most economical supply of oxygen, is passed over the cathode surface opposite to the cathode surface in contact with the catholyte.

In sum, separation of alkali metal ions from the solution introduced to the anode compartment occurs by alkali metal ions migrating through the membranes and concentration occurs by electrolytic consumption of water and evaporation of water.

The net result of the process is to cause the aqueous solution of alkali metal hydroxide, as it passes through the anode compartment, to be continuously depleted of alkali metal ions, resulting in an alkali metal ion concentration gradient existing between the inlet and outlet of the anode compartment. As a consequence of acceptance of alkali metal ions by the aqueous media passing through the cathode compartment and generation of hydroxide ions by reduction of oxygen, the aqueous media becomes more concentrated in alkali metal hydroxide as it progresses through the cathode compartment. The catholyte leaves the cathode compartment as a solution more concentrated in alkali metal hydroxide than the aqueous media introduced to the cathode compartment.

The present invention, in its preferred application, is for the treatment of a chloralkali cell liquor to produce a purified and concentrated aqueous caustic solution. In this application, chloralkali cell liquor containing sodium hydroxide and sodium chloride is introduced into the anode compartment of a two-compartment hybrid cell which preferably employs thin compartments. Hydrogen, generated by the chloralkali cell, is contacted with one surface of the gas diffusion anode of the hybrid cell. The hydrogen is oxidized at the anode with the production of water. The anode is separated from the cathode compartment by a membrane selectively permeable to cations. The gas diffusion cathode is contacted on the surface opposite the surface in contact with the catholyte by a flow of air. An aqueous medium, typically water or a dilute solution of a least one alkali metal hydroxide, is introduced into the cathode compartment.

Although the electrical energy generated as a consequence of the electrochemical oxidation and reduction reactions which occur in the hybrid cell may be fed to any load, it is advantageous to couple one or more hybrid cells in series or in parallel with the chloralkali cell to provide part of the electrical energy required to operate the chloralkali cell. When the same number of coulombs flow between the chloralkali cell and the hybrid cell, the following occurs in the hybrid cell: Sodium ions from the introduced chloralkali cell liquor pass transversely to the flow of the anolyte chloralkali cell liquor in the anode compartment, through the membrane and into the catholyte flowing in the cathode compartment. Hydroxyl ions generated as a consequence of reduction of oxygen at the cathode combine with the transferred sodium ions to form sodium hydroxide. Consumption of water by generation of hydroxyl ions also serves to concentrate the sodium hydroxide solution being formed in the cathode compartment. Additional concentration occurs by evaporation of water through the cathode into air passing over the surface of the cathode opposite to the surface in contact with the catholyte. This water evaporation also serves to cool the hybrid cell.

THE DRAWINGS

The invention may be more clearly understood by reference to the drawings, wherein:

FIG. 1 is a schematic illustration of a hybrid cell used in practice of this invention;

FIG. 2 is a partial cross-sectional view of a hybrid cell having a plurality of thin cell units; and FIG. 3 is a flow diagram showing a chloralkali cell and a hybrid cell being operated in combination.

DETAILED DESCRIPTION

Alkali metal hydroxide solutions, especially solutions containing alkali metal halides, can be treated in accordance with this invention. For efficiency, the solution preferably has, for instance, an alkali metal concentration between about 5 and 30 weight percent, calculated as the alkali metal hydroxide. Typically, the solution is a chloralkali cell liquor, having a concentration of between about 10 and 25 weight percent sodium hydroxide and up to about 15 percent by weight sodium chloride. Solutions of other alkali metal hydroxides, such as potassium hydroxide and lithium hydroxide, can also be treated. The cell liquor can also contain other alkali metal salts, such as sodium bromide, potassium iodide, and the like. The invention is adaptive to treating liquors from chloralkali cells, including diaphragm and membrane cells, mercury cells, and the like. However, the cell liquor from a membrane cell will be substantially free of alkali metal halide salts. Methods of operating such cells and the nature of the cell liquor produced in their operation are well known to those skilled in the art and have been described in an extensive body of technical publications and patents. Accordingly, the ensuing description will be directed primarily to the operation of the hybrid cells alone and in combination with chloralkali cells.

FIG. 1 schematically depicts the operation of a hybrid cell of this invention. A chloralkali cell liquor, containing about 12 weight percent NaOH and about 15 weight percent NaCl is introduced, as anolyte, into the anode compartment of the hybrid cell. The compartments of the fuel cell are designed to provide flow substantially in one direction from inlet to outlet without appreciable mixing, back convection, or diffusion of molecules and ions in the compartments. This may be achieved when the average distance (d) between anode and membrane and membrane and cathode are respectively about 1 mm or less, typically about 0.1 mm to about 1 mm.

The cell liquor contacts a gas diffusion type anode. Hydrogen gas from any source and preferably from a chloralkali cell, contacts the opposite side of the anode. The anode provides a surface for intimate contact between the hydrogen gas and the anolyte.

Hydrogen gas undergoes an oxidation reaction with the anolyte hydroxide ion at the anode which may be schematically represented as:

As the anolyte flows through the anode compartment, its hydroxide ion content is progressively reduced and its water content progressively increased.

Separating the anode compartment from the cathode compartment is a cation-permselective membrane, that is a membrane which is permeable to cations such as the sodium ion, but is relatively impermeable to anions such as the chloride ions. To maintain a chemical balance and to account for depletion of hydroxide ion from the anolyte, sodium ion, under condition of current flow through an external load, separates from the anolyte and passes through the cation-permselective membrane into a catholyte passing through the cathode compartment of the hybrid cell. Substantially all of the chloride ion remains in the anolyte, along with the equivalent number of sodium ions.

The cathode compartment of the fuel cell is separated from the anode compartment by the above-mentioned cation-permselective membrane. An aqueous medium such as water or dilute sodium hydroxide solution, the catholyte, is introduced into the cathode compartment and progressively picks up sodium ions moving through the cation-permselective membrane. The catholyte contacts one surface of a gas diffusion type cathode where oxygen gas, preferably from air, undergoes a reduction reaction with the catholyte water which may be schematically represented as follows:

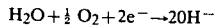

The generated hydroxide ions balance the sodium ions which enter the catholyte to form a caustic solution having increased caustic concentration in the direction of flow of the catholyte. Concentration is due in part to consumption of water at the cathode.

Contemporaneously, some water from the catholyte evaporates at the opposite surface of the cathode into the air stream. For a given cathode surface area and permeability, the flow of air may be regulated to control evaporation of water from the surface of the cathode to modify the concentration of sodium hydroxide in the catholyte. In practice, the rate of addition of water to the cathode compartment, the rate of transporation of water through the cation permselective membrane into the catholyte, the rate of consumption of water at the cathode, and the rate of evaporation of water from the cathode, are all correlated so as to provide a product catholyte of desired caustic concentration. Thus, when the cell liquor and the water introduced to the hybrid cell all flow through their respective compartments cocurrently, as shown in FIG. 1, the sodium hydroxide concentration of the anolyte decreases from about 12% by weight at the inlet and approaches 0% at the outlet, while sodium hydroxide concentration of the catholyte increases from about 0% at the inlet to about 20% to 50% by weight at the outlet. Such concentration differences are achievable with currently available membranes.

As indicated, the anolyte withdrawn from the anode compartment is substantially depleted of sodium hydroxide. However, even when the effluent from the anode compartment contains as little as 0.1 weight percent or 0.01 weight percent of sodium hydroxide, the pH of the effluent is high, i.e., above 12. The high pH of the effluent from the anode compartment is advantageous in that polarization and loss of current efficiency which can be associated with a change from an alkaline to a neutral or acid pH within the cell is avoided.

The process and hybrid cell illustrated in FIG. 1 can, of course, be used to treat cell liquors having differing concentrations of alkali metal hydroxide and alkali metal halide. By regulating the flow of water or dilute aqueous alkali hydroxide into the cathode compartment and by the evaporation of water from the porous cathode, the concentration of the product flowing from the cathode compartment can be varied over a wide range. Thus, the concentration of the product alkali metal hydroxide can be controlled. The extent of separation from anions is, however, limited by the concentration gradient across the membrane and as higher concentration differentials of alkali metal ion are sought, some diffusion of chloride can occur. This affects product catholyte purity.

The hybrid cell can be arranged in a filter press type structure with a multitude of elementary hybrid cells connected in series forming a net hybrid cell.

FIG. 2 is a partial cross-sectional view of a portion of a filter press hybrid cell unit showing the sequence and arrangement of elements in the cell. There is provided gas diffusion type cathodes 10 and electrically conductive gas separator and current collectors 12 which helps to define air channels 14 and hydrogen channels 16; gas diffusion type anodes 18; an anolyte compartment 20; a catholyte compartment 24 and membrane 26. The following conduits are formed by insulating ported spacers 30. Conduit 28 serves hydrogen channels 16; conduit 32 is for the anolyte liquor to be processed; conduit 34 is for the aqueous catholyte media and conduit 36 is for the air fed to channels 14.

Given the sequence of elements, such variables as the thickness and spacing of elements, the shape of the air and hydrogen channels are subject to wide variation. In addition, many different materials of construction may be employed because the process of this invention is practiced under relatively mild conditions, particularly when compared with the highly oxidative and corrosive conditions found in a chloralkali cell. Thus, any material stable to alkali hydroxide and cell operating temperature may be used.

Materials of construction and cell construction arrangements are described, for instance, in U.S. Pat. Nos. 3,098,762; 3,196,048; 3,296,025; 3,511,712; 3,516,866;

3,530,003; 3,764,391; 3,899,403; 3,901,731; 3,957,535; 4,036,717 and 4,051,002 and British patent specification Nos. 1,211,593 and 1,212,387, each incorporated herein by reference.

The cation permselective membranes may be solid aliphatic or armomatic sulfonates; phenolics; copolymers of ethylenically unsaturated monomers such as ethylene or propylene with ethylenically unsaturated carboxylic acids or salts thereof, and the like.

Whatever the selected material, the membrane should preferably have a permselectivity in 40% NaOH of at least about 0.95, an ohmic resistance not more than about 3 ohm-cm and an electrosmotic coefficient of not more than about 74 gms of water per Faraday.

The gas diffusion type anodes and cathodes employed in the construction of the hybrid cells are hydrophilic and may be varied widely, and generally consist of a gas diffusion barrier layer providing a catalytic surface. The gas diffusion layer may be catalytic per se or catalytic properties induced or promoted by a noble metal and the like. A suitable gas diffusion type cathode and/or anode may be formed of activated carbon which may be promoted by a noble metal and combined with a support material such as Teflon TM.

The hybrid cell can be operated at any temperature which maintains the electrolytes in a liquid state and avoids the precipitation of dissolved constituents such as alkali metal halide or alkali metal hydroxide. Temperatures of from about 20° C. to 100° C., more preferably 40° C. to 70° C., may be employed. Because the cell liquor from a chloralkali cell is warm and because heat is generated within the fuel cell during its operation, it is necessary to cool the cell to maintain a desired operating temperature. The cell is conveniently cooled as an incidence of evaporation of water from the catholyte through the gas diffusion type cathode into the stream of air which is passed across the surface of the cathode opposite to the surface in contact with the catholyte to supply oxygen to the cathode. In a filter press type of construction, the individual cells are so thin that there is excellent heat transfer between the anode, cathode, and fluid compartments.

To achieve effective cooling through the cathode by evaporation, it may be desirable to continuously introduce fresh, dry air into the hybrid cell at a point removed from the air intake which supplies the hybrid cell. Air can be dried conveniently by passing it over cooling coils or through desiccant such as silica gel in accordance with known methods. The flow of electrolytes through the compartments of the fuel cell can be cocurrent as shown in FIG. 1 or countercurrent. Cocurrent flow is presently preferred.

Air is the lowest cost source of oxygen. Other oxygen containing gases as well as oxygen enriched air can also be used but at greater expense.

FIG. 3 shows the interrelationships between chloralkali cells and hybrid cells used to treat the cell liquor from the chloralkali cells in accordance with this invention. Brine is introduced to the chloralkali cell 38 by line 40. Chlorine is generated at anode 42 and hydrogen released at cathode 44. Diaphragm 46 separates the compartments. Hydrogen generated in the chloralkali cells is supplied to gas diffusion anode 48 of the hybrid cell 49 and cell liquor to anode compartment 50 by line 51. Air is supplied to the gas diffusion cathode 52 and water to cathode compartment 54. With current flow, as induced by reduction of oxygen at the cathode and oxidation of hydrogen at the anode, sodium ions pass through membrane 56 to the cathode compartment.

The hybrid cell is in series with the chloralkali cell and will produce a fraction of the power consumed by the chloralkali cell. Thus, while additional electric current from an outside source is required to operate the chloralkali cell and is shown as "power supply", the external energy required to operate the chloralkali cell is reduced.

In a typical operation a cell liquor containing about 12 percent by weight NaOH and 15 percent by weight NaCl is supplied to anode compartment 50. Water is introduced to cathode compartment 54. The products withdrawn are a 19 percent by weight NaCl solution, containing some NaOH, from anode compartment 50 and a purified, substantially chlorine-free, 50 percent by weight NaOH solution from cathode compartment 54.

Although the hybrid cell may be operated in such a manner as to remove substantially all of the alkali metal hydroxide from the cell liquor, as indicated, it can be more efficient to operate the cell so as to leave a small proportion of the sodium hydroxide in the effluent from the anode compartment. When this is done, the current efficiency of the hybrid cell can be kept high to maximize the yield of electric current produced by the cell.

The effluent from the anode compartment of the hybrid cell can contain from about 3% to about 5% alkali metal hydroxide and can be fed to the anode compartment of another hybrid cell operated under conditions which are effective for removing the last few percent of the alkali metal from the anolyte. The conditions in such a finishing cell can be regulated to produce concentrated alkali metal hydroxide product even though the feed to the anode compartment is relatively dilute. However, because the concentration of alkali metal hydroxide from such a dilute feed is accomplished at lower current efficiency than the concentration from more concentrated feed, the cell produces little or no useable current. In the latter case, the cell can be run essentially under short circuited conditions which are effective for concentrating the alkali metal hydroxide but produces no useable current. In such a cell, all of the electrical current produced by oxidation of hydrogen in the cell is consumed in accomplishing the separation and concentration of the caustic from the dilute feed. However, because the bulk of the separation was accomplished in the main hybrid cells under conditions providing higher current efficiency, the overall current efficiency of the process is not seriously diminished.

Although the present invention has been described with reference to particular details and embodiments thereof, these details are intended to illustrate the invention, the scope of which is defined in the following claims.

What is claimed is:

1. A process for the production of alkali metal hydroxide and electrical energy which comprises:
   (a) introducing flow of an aqueous solution of at least one alkali metal hydroxide as anolyte through an anode compartment of at least one hybrid cell, the hybrid cell comprising a gas diffusion type anode having first and second surfaces, a membrane selectively permeable to cations and having first and second surfaces, and a gas diffusion type cathode having first and second surfaces, the first surface of said anode and the first surface of said membrane forming said anode compartment, the first surface of said cathode forming with said second surface of said membrane a cathode compartment; the formed anode compartment having an inlet and an outlet, and the formed cathode compartment having an inlet and an outlet, said anolyte flowing from the inlet to the outlet of said anode compartment (b) introducing flow of an aqueous fluid medium receptive to alkali metal ions as catholyte through said cathode compartment from the inlet to the outlet;

(c) causing, by a flow of current through an external load between said cathode and said anode generated by oxidation of hydrogen supplied to the second surface of said gas diffusion type anode and generation of hydroxide ions by reduction of an oxygen-containing gas supplied to the second surface of the gas diffusion type cathode, alkali metal ions to selectively pass from the anolyte through said membrane to the catholyte in said cathode compartment to form, with cathode generated hydroxide ions, an aqueous solution of alkali metal hydroxide;

(d) withdrawing from said cathode compartment the catholyte which is more concentrated in respect to alkali metal hydroxide than the aqueous media introduced to said cathode compartment; and (e) withdrawing from said anode compartment an aqueous solution depleted in alkali metal hydroxide.

2. A process as claimed in claim 1 in which the aqueous solution of alkali metal hydroxide introduced to said anode compartment is a solution comprising up to about 25 percent by weight alkali metal hydroxide.

3. A process as claimed in claim 2 in which the solution withdrawn from said anode compartment contains alkali metal hydroxide in a concentration above about 0.01 percent by weight.

4. A process as claimed in claim 1 in which the aqueous alkali metal hydroxide solution withdrawn from said cathode compartment contains alkali metal hydroxide in an amount up to about 50 percent by weight.

5. A process as claimed in claim 4 in which the aqueous solution of at least one alkali metal hydroxide introduced to said anode compartment is a solution comprising up to about 25 percent by weight alkali metal hydroxide.

6. A process as claimed in claim 1 in which the aqueous solution of at least one alkali metal hydroxide introduced to said anode compartment is a solution comprising up to about 25 percent by weight medium hydroxide.

7. A process as claimed in claim 6 in which the solution exiting the cathode compartment contains sodium hydroxide in a concentration up to about 50 percent by weight.

8. A process as claimed in claim 1 in which air flows over a second surface of the gas diffusion type cathode opposite said first surface in a quantity sufficient to remove water from the cathode to concentrate the solution of alkali hydroxide flowing through the cathode compartment.

9. A process as claimed in claim 1 in which the oxygen-containing gas is air.

10. A process as claimed in claim 1 in which the flow of anolyte from the inlet to the outlet of the anode compartment and the flow of catholyte from the inlet to the outlet of the cathode compartment are respectively substantially in one direction without appreciable mixing, back convection or diffusion of molecules and ions contained in said anolyte and catholyte.

11. A process for the production of sodium hydroxide from the aqueous effluent of a cathode compartment of a chloralkali cell and electrical energy which comprises:

(a) introducing as anolyte flow of an aqueous effluent solution of at least one chloralkali cell, said solution comprising sodium hydroxide and sodium chloride as anolyte to an anode compartment of at least one hybrid cell, the hybrid cell comprising a gas diffusion type anode having first and second surfaces, a membrane permeable to sodium ions and having first and second surfaces, and a gas diffusion type cathode having first and second surfaces, the first surface of said anode and the first surface of said membrane forming the anode compartment, and the first surface of said gas diffusion type cathode forming with the second surface of said membrane a cathode compartment, the formed anode compartment, having and inlet and an outlet, and the formed cathode compartment, having an inlet and an outlet, said anolyte flowing from the inlet to the outlet of said anode compartment;

(b) introducing flow of an aqueous fluid medium receptive to sodium ions as catholyte from the inlet to the outlet of said cathode compartment;

(c) supplying an oxygen-containing gas to said second surface of said gas diffusion type cathode and hydrogen to the second surface of said gas diffusion type anode;

(d) causing, by a flow of current through said chloralkali cell from said gas diffusion type cathode to said gas diffusion type anode of the hybrid cell and generated by oxidation of hydrogen at said gas diffusion type anode and generation of hydroxide ion by reduction of oxygen at said gas diffusion type cathode, sodium ions to selectively pass through said membrane to said cathode compartment to form with cathode generated hydroxide ions an aqueous solution of sodium hydroxide;

(e) removing from said cathode compartment catholyte which is more concentrated in respect to sodium hydroxide than the solution introduced to said anode compartment; and (f) removing from said anode compartment an aqueous solution depleted in sodium hydroxide.

12. A process as claimed in claim 11 in which air flows over said second surface of the cathode in a quantity sufficient to remove water from the cathode to concentrate the sodium hydroxide solution passing through the cathode compartment.

13. A process as claimed in claim 11 in which the aqueous effluent solution of the chloralkali cell introduced to said anode compartment is a solution comprising up to about 25 percent by weight sodium hydroxide and up to 15 percent by weight sodium chloride.

14. A process as claimed in claim 13 in which the solution withdrawn from said anode compartment contains sodium hydroxide in concentration above about 0.01 percent by weight.

15. A process as claimed in claim 13 in which the solution exiting the cathode compartment contains sodium hydroxide in a concentration up to about 50 percent by weight.

16. A process as claimed in claim 11 in which the aqueous effluent solution of the chloralkali cell introduced to said anode compartment comprises from about 10 to about 15 weight percent sodium hydroxide and up to about 15 weight percent sodium chloride.

17. A process as claimed in claim 16 in which the solution withdrawn from said anode compartment contains sodium hydroxide in concentration above about 0.01 percent by weight.

18. A process as claimed in claim 16 in which the solution exiting the cathode compartment contains sodium hydroxide in a concentration up to about 50 percent by weight.

19. A process as claimed in claim 11 in which the solution exiting the cathode compartment contains sodium hydroxide in a concentration up to about 50 percent by weight.

20. A process as claimed in claim 11 in which the hydrogen supplied to the anode is hydrogen generated by the chloroalkali cell.

21. A process as claimed in claim 11 in which the oxygen-containing gas is air.

22. A process as claimed in claim 11 in which the flow of anolyte from the inlet to the outlet of the anode compartment and the flow of catolyte from the inlet to the outlet of the cathode compartment are respectively substantially in one direction without appreciable mixing, back convection or diffusion of molecules and ions contained in said anolyte and catholyte.

23. A process for preparing a concentrated, substantially sodium chloride free, aqueous solution of sodium hydroxide from the aqueous effluent solution of the cathode compartment of a chloralkali cell, which effluent solution comprises sodium hydroxide and sodium chloride, and simultaneously producing electrical energy which comprises:

(a) introducing said solution as anolyte flow to an anode compartment of a hybrid cell, the hybrid cell comprising a gas diffusion type anode having first and second surfaces, a membrane permeable to sodium ions and having first and second surfaces, and a gas diffusion type cathode having first and second surfaces, the first surface of said anode and the first surface of said membrane forming the anode compartment, the first surface of said gas diffusion type cathode, and the second surface of said membrane forming a cathode compartment, the formed anode compartment having an inlet and an outlet, and the formed cathode compartment, having an inlet and an outlet, said anolyte flowing from the inlet to the outlet of said anode compartment;

(b) introducing flow of an aqueous fluid medium receptive to sodium ions as catholyte from the inlet to the outlet of said cathode compartment;

(c) supplying air to the second surface of said gas diffusion type cathode in a quantity sufficient to remove water from the catholyte and hydrogen, generated by said chloralkali cell, to the second surface of said anode;

(d) causing, by a flow of current through said chloralkali cell from said cathode to said gas diffusion type anode to the hybrid cell and generated by oxidation of hydrogen at said gas diffusion type anode and generation of hydroxide ion by reduction of oxygen from the air at said gas diffusion type cathode, sodium ions to selectively pass through said membrane to said cathode compartment to form with cathode generated hydroxide ions an aqueous solution of sodium hydroxide;

(e) withdrawing from said cathode compartment catholyte which is more concentrated in respect to sodium hydroxide than the solution introduced to said anode compartment; and (f) removing from said anode compartment an aqueous solution depleted in sodium ions.

24. A process as claimed in claim 23 in which the flow of anolyte from the inlet to the outlet of the anode compartment and the flow of catolyte from the inlet to the outlet of the cathode compartment are respectively substantially in one direction without appreciable mixing, back convection or diffusion of molecules and ions contained in said anolyte and catholyte.

* * * * *

UNITED STATES PATENT AND TRADEMARK OFFICE
CERTIFICATE OF CORRECTION

PATENT NO. : 4,246,078
DATED : January 20, 1981
INVENTOR(S) : Bogdan M. Broniewski It is certified that error appears in the above—identified patent and that said Letters Patent is hereby corrected as shown below:

Column 7, line 6, "armomatic" should read -- aromatic --.

Column 9, line 50 "medium" should read -- sodium --.

Signed and Sealed this

Twenty-third Day of June 1981

[SEAL]

Attest:

RENE D. TEGTMEYER

*Attesting Officer*     *Acting Commissioner of Patents and Trademarks*